United States Patent
Lundh et al.

(12)

(10) Patent No.: US 6,295,274 B1
(45) Date of Patent: Sep. 25, 2001

(54) REDUNDANCY STRUCTURE IN A DIGITAL SWITCH

(75) Inventors: Peter Lundh, Skärholmen; Anders Bjenne, Huddinge, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/053,820

(22) Filed: Apr. 2, 1998

(30) Foreign Application Priority Data

Oct. 3, 1995 (SE) .................................................... 9503421

(51) Int. Cl.[7] ................................ H04L 1/00; H04L 1/22; G06F 11/00
(52) U.S. Cl. .......................... 370/216; 370/242; 370/252; 714/2; 714/797
(58) Field of Search .................................... 370/216, 242, 370/244, 248, 252; 714/2, 6, 11, 25, 746, 797, 799

(56) References Cited

U.S. PATENT DOCUMENTS

| | | | |
|---|---|---|---|
| 4,393,490 | 7/1983 | Culley | 370/244 |
| 4,535,442 | 8/1985 | Maddern et al. | 370/220 |
| 4,706,150 | 11/1987 | Lebizay et al. | 340/825.5 |
| 5,278,843 | 1/1994 | Ako | 714/797 |
| 5,278,849 | 1/1994 | Hall | 714/50 |
| 5,305,325 | 4/1994 | Roos | 714/703 |
| 5,450,397 | 9/1995 | Wahlman | 370/411 |

FOREIGN PATENT DOCUMENTS

| | | |
|---|---|---|
| 0 097 781 | 1/1984 | (EP) . |
| 1 393 645 | 5/1975 | (GB) . |
| 1 439 568 | 6/1976 | (GB) . |
| 1 582 456 | 1/1981 | (GB) . |
| 466 475 | 2/1992 | (SE) . |
| 94/18770 | 8/1994 | (WO) . |

OTHER PUBLICATIONS

Larsson, Mikael, et al. "The ATM Switch Concept and the ATM Pipe Switch", vol. 70, No. 1, pp 12–20, (1993).

*Primary Examiner*—Wellington Chin
*Assistant Examiner*—Maikhanh Tran
(74) *Attorney, Agent, or Firm*—Burns, Doane, Swecker & Mathis, L.L.P.

(57) ABSTRACT

A functional entity in a digital switch is triplicated in planes operating in parallel. From each plane, a respective passing data flow is spread to parallel planes. A majority vote function receives the data flows of the planes and compares these on a bit level for creating a majority voted data flow. A plane condition sensing function indicates whether links of the planes have meaningful information and synchronism, and emits, as a result, a link condition indicating signal for each plane. A priority select function is connected for receiving the majority voted data flow and the link condition indicating signals. If the link condition indicating signals indicate a fault condition, the priority select function lets the majority voted data flow through as an outgoing data flow from the functional entity. In case a fault condition is indicated in one or more of the link condition indicating signals, the priority select function selects the data flow from one of the planes as an outgoing dataflow based upon an established priority order.

18 Claims, 9 Drawing Sheets

| FRC 13:12 | FRC 11:0 | Plane A | Plane B | Plane C | Forced to 0: | Testing: 502 504 506 516 | PFA, PFB, PFC, PRIH, PRIL |
|---|---|---|---|---|---|---|---|
| 0 | 0-2559 | 1 1100 0111 | 1 1100 0111 | 1 1100 0111 | | | |
| 1 | 0-2559 | 1 1100 0111 | 1 1100 0111 | 1 1100 0111 | | | |
| 2 | 0-2559 | 1 1100 0111 | 1 1100 0111 | 1 1100 0111 | | | |
| 3 | 0 | 0 0111 1111 | 1 0111 1111 | 1 0111 1111 | INSYCI | PC,MV,DETEC | PFA |
| | 1 | 1 0111 1111 | 1 1111 1111 | 1 1111 1111 | INSYCI | -"- | -"- |
| | 2 | 1 1011 1111 | 1 1111 1111 | 1 1111 1111 | INSYCI | -"- | -"- |
| | 3 | 1 1101 1111 | 1 1111 1111 | 1 1111 1111 | INSYCI | -"- | -"- |
| | 4 | 1 1110 1111 | 1 1111 1111 | 1 1111 1111 | INSYCI | -"- | -"- |
| | 5 | 1 1111 0111 | 1 1111 1111 | 1 1111 1111 | INSYCI | -"- | -"- |
| | 6 | 1 1111 1011 | 1 1111 1111 | 1 1111 1111 | INSYCI | -"- | -"- |
| | 7 | 1 1111 1101 | 1 1111 1111 | 1 1111 1111 | INSYCI | -"- | -"- |
| | 8 | 1 1111 1110 | 1 1111 1111 | 1 1111 1111 | INSYCI | -"- | -"- |
| | 9 | 1 0000 0000 | 0 0000 0000 | 0 0000 0000 | INSYCI | -"- | -"- |
| | 10 | 1 1000 0000 | 1 0000 0000 | 1 0000 0000 | INSYCI | -"- | -"- |
| | 11 | 0 0100 0000 | 0 0000 0000 | 0 0000 0000 | INSYCI | -"- | -"- |
| | 12 | 0 0010 0000 | 0 0000 0000 | 0 0000 0000 | INSYCI | -"- | -"- |
| | 13 | 0 0001 0000 | 0 0000 0000 | 0 0000 0000 | INSYCI | -"- | -"- |
| | 14 | 0 0000 1000 | 0 0000 0000 | 0 0000 0000 | INSYCI | -"- | -"- |
| | 15 | 0 0000 0100 | 0 0000 0000 | 0 0000 0000 | INSYCI | -"- | -"- |
| | 16 | 0 0000 0010 | 0 0000 0000 | 0 0000 0000 | INSYCI | -"- | -"- |
| | 17 | 0 0000 0001 | 0 0000 0000 | 0 0000 0000 | INSYCI | -"- | -"- |
| | 18 | 1 1111 1111 | 0 0000 0000 | 0 0000 0000 | INSYCI | PRI | PFA,PRIH |
| | 19 | 0 0000 0000 | 1 1111 1111 | 1 1111 1111 | INSYCI | -"- | PFA,PRIL |
| | 20 | 0 0000 0000 | 1 1111 1111 | 0 0000 0000 | INSYAI,CI | -"- | PFB,PRIH |
| | 21 | 1 1111 1111 | 0 0000 0000 | 1 1111 1111 | INSYCI,CI | -"- | PFB,PRIL |

FIG. 8a

| FRC 13:12 | FRC 11:0 | Plane A | Plane B | Plane C | Forced to 0: | Testing: 502 504 506 516 | PFA, PFB, PFC, PRIH, PRIL |
|---|---|---|---|---|---|---|---|
| 3 | 22 | 1 0111 1111 | 0 0111 1111 | 1 0111 1111 | INSYAI | PC,MV,DETEC | PFB |
|  | 23 | 1 1111 1111 | 1 0111 1111 | 1 1111 1111 | INSYAI | -"- | -"- |
|  | 24 | 1 1111 1111 | 1 1011 1111 | 1 1111 1111 | INSYAI | -"- | -"- |
|  | 25 | 1 1111 1111 | 1 1101 1111 | 1 1111 1111 | INSYAI | -"- | -"- |
|  | 26 | 1 1111 1111 | 1 1110 1111 | 1 1111 1111 | INSYAI | -"- | -"- |
|  | 27 | 1 1111 1111 | 1 1111 0111 | 1 1111 1111 | INSYAI | -"- | -"- |
|  | 28 | 1 1111 1111 | 1 1111 1011 | 1 1111 1111 | INSYAI | -"- | -"- |
|  | 29 | 1 1111 1111 | 1 1111 1101 | 1 1111 1111 | INSYAI | -"- | -"- |
|  | 30 | 1 1111 1111 | 1 1111 1110 | 1 1111 1111 | INSYAI | -"- | -"- |
|  | 31 | 0 0000 0000 | 1 0000 0000 | 0 0000 0000 | INSYAI | -"- | -"- |
|  | 32 | 1 0000 0000 | 1 1000 0000 | 1 0000 0000 | INSYAI | -"- | -"- |
|  | 33 | 0 0000 0000 | 0 0100 0000 | 0 0000 0000 | INSYAI | -"- | -"- |
|  | 34 | 0 0000 0000 | 0 0010 0000 | 0 0000 0000 | INSYAI | -"- | -"- |
|  | 35 | 0 0000 0000 | 0 0001 0000 | 0 0000 0000 | INSYAI | -"- | -"- |
|  | 36 | 0 0000 0000 | 0 0000 1000 | 0 0000 0000 | INSYAI | -"- | -"- |
|  | 37 | 0 0000 0000 | 0 0000 0100 | 0 0000 0000 | INSYAI | -"- | -"- |
|  | 38 | 0 0000 0000 | 0 0000 0010 | 0 0000 0000 | INSYAI | -"- | -"- |
|  | 39 | 0 0000 0000 | 0 0000 0001 | 0 0000 0000 | INSYAI | -"- | -"- |
|  | 40 | 0 0000 0000 | 1 1111 1111 | 0 0000 0000 | INSYAI | PRI | PFB,PRIH |
|  | 41 | 1 1111 1111 | 0 0000 0000 | 1 1111 1111 | INSYAI | -"- | PFB,PRIL |
|  | 42 | 1 0111 1111 | 0 0111 1111 | 0 0111 1111 | INSYAI,BI | PC,MV,DETEC | PFC |
|  | 43 | 1 1111 1111 | 1 1111 1111 | 1 0111 1111 | INSYAI,BI | -"- | -"- |
|  | 44 | 1 1111 1111 | 1 1111 1111 | 1 1011 1111 | INSYAI,BI | -"- | -"- |
|  | 45 | 1 1111 1111 | 1 1111 1111 | 1 1101 1111 | INSYAI,BI | -"- | -"- |
|  | 46 | 1 1111 1111 | 1 1111 1111 | 1 1110 1111 | INSYAI,BI | -"- | -"- |
|  | 47 | 1 1111 1111 | 1 1111 1111 | 1 1111 0111 | INSYAI,BI | -"- | -"- |
|  | 48 | 1 1111 1111 | 1 1111 1111 | 1 1111 1011 | INSYAI,BI | -"- | -"- |
|  | 49 | 1 1111 1111 | 1 1111 1111 | 1 1111 1101 | INSYAI,BI | -"- | -"- |
|  | 50 | 1 1111 1111 | 1 1111 1111 | 1 1111 1110 | INSYAI,BI | -"- | -"- |
|  | 51 | 0 0000 0000 | 0 0000 0000 | 1 0000 0000 | INSYAI,BI | -"- | -"- |

FIG. 8b

| FRC 13:12 | FRC 11:0 | Plane A | Plane B | Plane C | Forced to 0: | Testing: 502 504 506 516 | PFA, PFB, PFC, PRIH, PRIL |
|---|---|---|---|---|---|---|---|
| 3 | 52 | 1 0000 0000 | 1 0000 0000 | 1 1000 0000 | INSYAI,BI | PC,MV,DETEC | PFC |
|  | 53 | 0 0000 0000 | 0 0000 0000 | 0 0100 0000 | INSYAI,BI | -"- | -"- |
|  | 54 | 0 0000 0000 | 0 0000 0000 | 0 0010 0000 | INSYAI,BI | -"- | -"- |
|  | 55 | 0 0000 0000 | 0 0000 0000 | 0 0001 0000 | INSYAI,BI | -"- | -"- |
|  | 56 | 0 0000 0000 | 0 0000 0000 | 0 0000 1000 | INSYAI,BI | -"- | -"- |
|  | 57 | 0 0000 0000 | 0 0000 0000 | 0 0000 0100 | INSYAI,BI | -"- | -"- |
|  | 58 | 0 0000 0000 | 0 0000 0000 | 0 0000 0010 | INSYAI,BI | -"- | -"- |
|  | 59 | 0 0000 0000 | 0 0000 0000 | 0 0000 0001 | INSYAI,BI | -"- | -"- |
|  | 60 | 0 0000 0000 | 0 0000 0000 | 1 1111 1111 | INSYAI,BI | PRI | PFC,PRIH |
|  | 61 | 1 1111 1111 | 1 1111 1111 | 0 0000 0000 | INSYAI,BI | -"- | PFC,PRIL |
|  | 62 | 1 1111 1111 | 0 0000 0000 | 0 0000 0000 | INSYBI | -"- | PFA,PRIH |
|  | 63 | 0 0000 0000 | 1 1111 1111 | 1 1111 1111 | INSYBI | -"- | PRA,PRIL |
|  | 64 | 1 1111 1111 | 0 0000 0000 | 0 0000 0000 | INSYBI,CI | -"- | PFA,PRIH |
|  | 65 | 0 0000 0000 | 1 1111 1111 | 1 1111 1111 | INSYBI,CI | -"- | PFA,PRIL |
|  | 66 | 1 1111 1111 | 0 0000 0000 | 0 0000 0000 | INSYAI,BI,CI | -"- | PFA,PRIH |
|  | 67 | 0 0000 0000 | 1 1111 1111 | 1 1111 1111 | INSYAI,BI,CI | -"- | PFA,PRIL |
|  | 68 | 1 1111 1111 | 0 0000 0000 | 0 0000 0000 |  | -"- | PFA |
|  | 69 | 0 0000 0000 | 1 1111 1111 | 1 1111 1111 |  | -"- | PFA |
|  | 70 | 0 0000 0000 | 1 1111 1111 | 0 0000 0000 |  | -"- | PFB |
|  | 71 | 1 1111 1111 | 0 0000 0000 | 1 1111 1111 |  | -"- | PFB |
|  | 72 | 0 0000 0000 | 0 0000 0000 | 1 1111 1111 |  | -"- | PFC |
|  | 73 | 1 1111 1111 | 1 1111 1111 | 0 0000 0000 |  | -"- | PFC |
|  | 74-319 | 1 1100 0111 | 1 1100 0111 | 1 1100 0111 |  |  |  |

FIG. 8c

REDUNDANCY STRUCTURE IN A DIGITAL SWITCH

This application is a continuation of International Application No. PCT/SE96101235, which was filed on Oct. 2, 1996, which designated the United States, and which is expressly incorporated here by reference.

BACKGROUND

The present invention according to a first aspect relates to a redundancy system for a functional entity in a digital switch, and a method for providing such a redundancy system.

According to a second aspect the invention relates to a redundancy system for a digital switch with switch inputs and switch outputs and switch equipment therebetween. The switch equipment comprises a switch core and functional entities, a, connection path for data flows between a switch input and a, switch output being able to comprise a number of such functional, entities on both sides of the core. The redundancy system comprises switch planes working in parallel and having mutually essentially identical switch equipment and majority vote functions, distributing means for distributing a data flow coming in from the outside to the equipments of the switch planes, and assembling means for assembling the data flows coming from the switch planes.

According to the second aspect the invention also relates to a method for providing a redundancy structure for a digital switch with switch inputs and switch outputs and switch equipment therebetween, that comprises a switch core and functional entities, a connection path for data flows between a switch input and a switch output being able to comprise a number of such functional entities on both sides of the core.

U.S. Pat. No. 4,706,150 relates to a switching protocol for multiple autonomous switching planes. Supervision is performed of switching in the planes and retrials are provided when connection attempts are unsuccessful. The retrials can consist in a user having established connections through a majority of the planes emitting a retrial request that sets aside the already established connections in the remaining planes. According to an alternative form all users emit retry requests, the planes in accordance with a priority scheme among the users accepting a higher prioritized request and rejecting a lower one.

U.S. Pat. No. 5,278,843 discloses a multiple processor system in which appearance of faults in the microprocessors is decided in accordance with a majority rule and selection is performed on the basis thereof and a predetermined priority order, an output signal being emitted from the microprocessor in which there is no fault and the priority order of which is higher.

In EP 097,781 there is described a method for testing very fast logic systems while using a slow testing device. Different test patterns are used at the testing.

U.S. Pat. No. 4,393,490 relates to digital switch systems with built-in fault identification, there being used i.a. a fault pattern injection.

U.S. Pat. No. 4,535,442, GB 1,393,645, GB 1,439,568 and GB 1,582,456 describe different types of digital switch systems with fault supervision.

Majority vote functions in triplicated redundancy systems have been used during a long time, e.g. in telecommunication equipments.

An example of this appears e.g. from the Swedish patent 466,475.

Use only of majority votes, has in certain cases turned out to be unsufficient when all three planes are not fault free. In particular this is true in case of problems arising at managing the planes in a system due to a fault when a plane or a card is replaced or the system is expanded or reconfigured when changing card types. This can give rise to disturbances on a system level.

SUMMARY

A first general object of the invention is to provide an improved redundancy system for telecommunication equipments, in particular digital time switches.

In a redundancy system building upon use of majority vote functions there is a second object to introduce functionality enabling handling of problems caused by one or more of the planes being not fault free.

A third particular object is to introduce functionality that results in improved handling of the planes due to faults when planes or cards are exchanged, or when the system is expanded or reconfigured in case of changing card types.

A fourth particular object in the just mentioned context is to enable handling of cards without disturbances on a system level.

Further objects will appear from the closer description henceforth of the invention and its advantages, in particular the description of embodiments with reference to the drawings.

The above objects have been attained by that stated in the attached patent claims.

In the redundancy system according to the first aspect, the functional entity is at least triplicated in planes working in parallel, means are provided for spreading from each plane a respective passing-by data flow to each plane in parallel therewith. Each plane has a unit for maintenance functions including a majority vote function that receives the data flows of the own plane and the planes in parallel therewith and compares these on a bit level for creating a majority voted data flow. A plane condition sensing function indicates if links of the planes have meaningful information and synchronism and as a result emits a link condition indicating signal for each plane, that forms an indication thereof. A priority select function is connected to receive the majority voted data flow and the link condition indicating signals and, if the latter do not indicate a fault condition, lets through the majority voted data flow as an outgoing data flow from the functional unit. In case of indication of a fault condition in one or more of the link condition indicating, signals the priority select function selects the data flow from one of the planes as an outgoing data flow on the basis of a determined priority order.

The redundancy system according to the second aspect is distributed to at least a plurality of the functional entities on each of the connection paths for data flow between switch output and switch input, in a way that each such functional entity has its own redundancy subsystem with planes working in parallel and comprising means for spreading from the equipment of each plane a respective passing-by data flow to each equipment in parallel therewith. Each plane and each switch output has a unit for maintenance functions including a majority vote function that, receives the data flows of the own plane and the planes in parallel therewith and compares these on a bit level for creating a majority voted data flow. A plane condition sensing function indicates if links of the planes have meaningful information and synchronism and as a result emits a link condition indicating signal for each plane, that forms an indication thereof. A priority select function is connected to receive the majority voted data flow and the link condition indicating signals. If the link condition indicating signals do not indicate a fault condition, the priority select function lets through the majority voted data flow as an outgoing data flow, but in case of indication of a fault condition in one or more of the link condition indicating signals the priority select function selects the data flow from one of the planes as an outgoing data flow on the basis of a determined priority order.

The redundancy systems according to the first and second aspects have a number of preferred and important embodiments, of which some are stated below.

The unit for maintenance functions suitably also includes a plane comparison function that compares the parallel data flows with the majority voted data flow and in case of deviation from this emits a fault indicating signal for the deviating data flows.

The majority vote function and plane comparison function can, in that connection, be tested by successively temporarily changing the look of the data flows from the planes in a way that in the data flow from one plane at a time there is introduced a sequence of known test bit patterns.

A pattern detecting function can, in that connection, be connected to the output of the priority select function for sensing in the outgoing data flow said test bit pattern during determined sections of the data flow.

According to a very important embodiment, the plane condition sensing function receives a link condition indicating input signal for each plane and forwards these signals as link state indicating ouput signals to the priority select function. The plane condition sensing function then includes means to impart, for testing purpose, to one or more of the link condition indicating output signals link fault indicating values during said determined section of the data flow.

The priority select function is tested by deactivating one or more of the link condition indicating signals and sending other signal patterns from the plane expected to be selected than from the other two planes in such a way that all cases are simulated that can appear according to the determined priority order.

Furthermore, there are preferably means in each plane for continuously rewriting/updating memory positions between the planes, as well as means for reading out one position from a memory in the own plane and in each of the other planes to a majority vote/priority select function in the respective plane. Means are furthermore provided for returning the result from the majority vote/priority selection to the memory of the own plane and writing it in on the same position.

For fault localization of circuit cards there can furthermore, according to one embodiment, be provided means for producing a count of a checksum for each circuit card interface in all of the planes, means for plane comparison of check sums on a bit level in turn in the respective planes, and means for indicating, in case of deviation in some checksum, from any plane, this deviation and pointing out the check sum that is wrong.

In the method according to the first aspect at least triplication of the functional entity in planes working in parallel, and spreading from each plane a respective passing-by data flow to the equipment of each plane in parallel therewith is performed. In each plane the data flows of the own plane and the planes in parallel therewith are compared on a bit level for creating a majority voted data flow. Indication is performed of whether the links of the planes have meaningful information and synchronism and as a result a link condition indicating signal is emitted. If the link condition indicating signals do not indicate a fault condition, the majority voted data flow is emitted as an outgoing data flow, but in case of indication of a fault condition in one or more of the link condition indicating signals, the data flow from one of the planes is selected as an outgoing data flow on the basis of a determined priority order.

In the method according to the second aspect the redundancy system is distributed to at least a plurality of the functional entities on each of the connection paths for data flow from switch input to switch output, in a way that each such functional entity has its own redundancy subsystem with planes working in parallel. From the equipment of each plane a respective passing-by data flow is spread to each equipment in parallel therewith, and in each plane and each switch output the data flows of the own plane and the planes in parallel therewith are compared on a bit level for creating a majority voted data flow. Indication is performed of whether links of the planes have meaningful information and synchronism and as a result a link condition indicating signal is emitted for each plane, that forms an indication thereof. If the link condition indicating signals do not indicate a fault condition, the majority voted data flow is let through as an outgoing data flow from the functional unit, but in case of indication of a fault condition in one or more of the link condition indicating signals the data flow from one of the planes is selected as an outgoing data flow on the basis of a determined priority order.

The methods according to the first and second aspects have a number of preferred and important embodiments, of which some are stated below.

The parallel data flows are compared with the majority voted data flow and in case of deviation from this a fault indicating signal is emitted for the deviating data flows.

The majority vote and the plane comparison are tested by successively temporarily changing the look of the data flows from the planes in a way that in the data flow from one plane at a time there is introduced a sequence of known test bit patterns.

In the outgoing data flow the test bit pattern is sensed during determined sections of the data flow.

A link condition indicating input signal is received for each plane and is forwarded as link state indicating ouput signals to the priority selection, and to one or more of the link condition indicating output signals are link fault indicating values imparted during determined sections of the data flow.

The priority selection is tested by deactivating one or more of the link condition indicating signals and sending other signal patterns from the plane expected to be selected than from the other two planes in such a way that all cases are simulated that can appear according to the determined priority order.

Rewriting/updating between the planes of memory positions is continuously performed by reading out one position from a memory in the own plane and in each of the other planes and exposing the position to a majority vote/priority selection in the respective plane, and the result from the majority vote/priority selection is passed back to the memory of the own plane and is written into the same position.

For fault localization of circuit cards a checksum is counted for each circuit card interface in all of the planes, plane comparison of check sums is performed on a bit level in turn in the respective planes, and, in case of deviation in some checksum, from any plane, this deviation is indicated and the check sum that is wrong is pointed out.

Accordingly there is suggested, in accordance with that defined more in detail above, a mechanism that admits prioritizing according to a determined order between the planes as soon as all three planes are not fault free. The main advantage appears at handling of the planes due to faults when a plane or a card are exchanged or when the system is expanded or reconfigured in case of changing of card types. The prioritizing enables handling of cards without disturbances on a system level.

The proposal also includes routine tests for supervision and maintenance.

Likewise functionality for updating between the planes is included, that is used in case of soft faults and card exchange for making them synchronous. Updating is used for all memories; the information of which has a certain duration in time. Without updating, soft faults in these memories could at last imply that disturbances affect connected devices due to double faults.

To sum up, a switch implementation of the invention can include use of:

majority vote in operation,
transition to priority selection when one or more links are out of synchronism,
switch plane comparison for switch operation maintenance,
routine tests based upon use of test patterns,
updating between the switch planes.

The maintenance in the switch is based upon the fact that it consists of three identical and synchronously operating switch planes. Data to connected devices is selected by majority vote before forwarding them. Use of majority vote makes the switch tolerant to bit faults in one switch plane at a time. For attaining enough fault localization, data are also majority voted on the switch core side of a multiplexer/demultiplexer step between a switch port and the switch core. Majority vote is also used together with cross connections between the switch planes for giving to different memories the same contents in the three switch planes. The majority vote is performed on a bit level but works with parallel data. If some switch plane goes out of synchronism priority selection is started.

The logic for majority vote, switch plane comparison and priority selection is autonomously tested by regularly sending out a determined test pattern in a time slot in the frame. This time lot is used for automatic routine tests of circuits for switch plane comparison, majority vote and priority selection. Differences between the switch planes are deliberately introduced in this time slot. The fault indication obtained is interpreted as a confirmation that the fault detecting circuits operate correctly.

BRIEF DESCRIPTION OF THE DRAWINGS

The invention will now be described more closely below with reference to the attached drawings on which

DETAILED DESCRIPTION OF EMBODIMENTS

Figure 1:
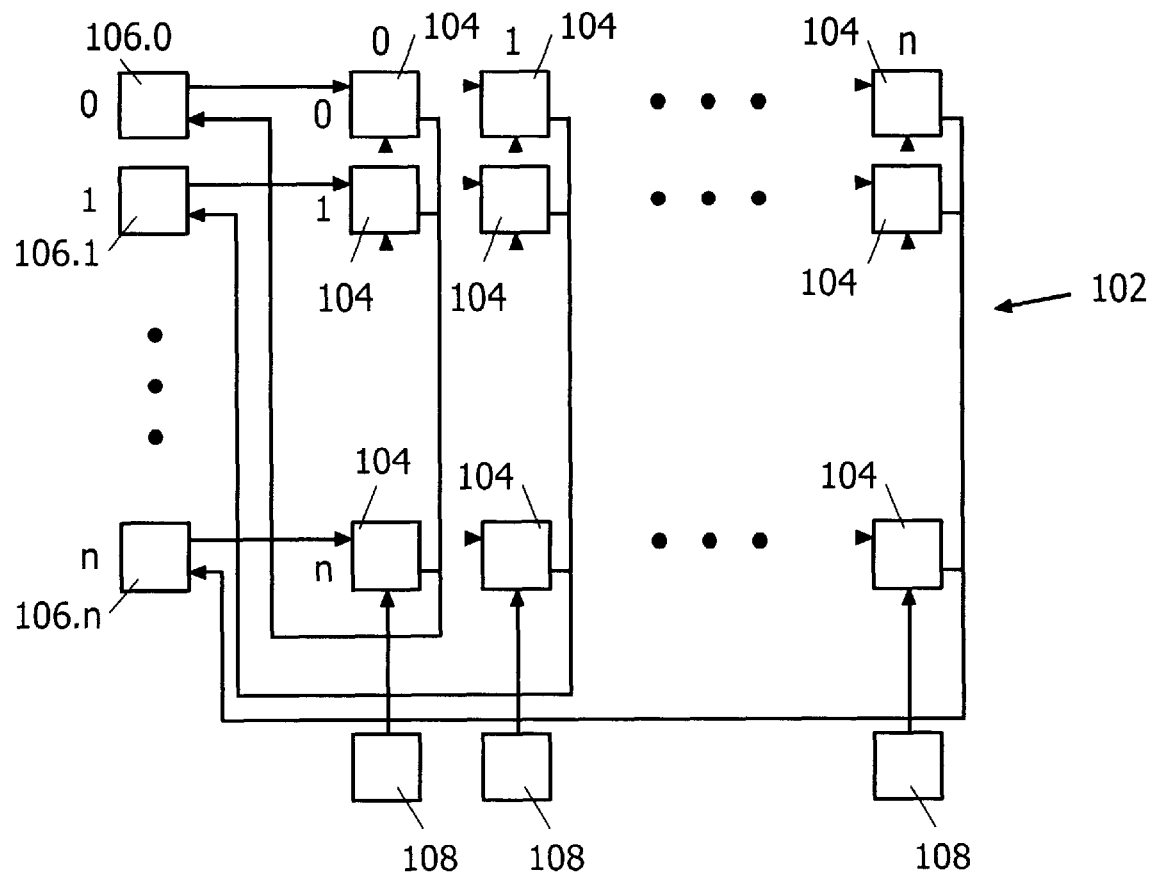
FIG. 1 is a schematic logical picture of the essential design of a STM switch.

FIG. 1 schematically shows a logical picture of the essential design of a STM switch (Synchronous Transfer Mode). A switch core, generally designated 102, has a so called time/space structure, by which is meant a switch in which two choices are performed, one time choice and one space choice. The data flow in the switch is assumed, as an example, to be organized in 125 uS long frames containing a number of time slots. The time slots consist of data time slots used for data, and control time slots.

The switch core 102 contains switch memories 104 arranged in rows and columns in a square matrix, wherein each row of switch memories is filled with data from an incoming link. Each one of blocks 106.0–106.*n* represents a number of switch ports which are two-way connected to the core 102. The writing into the memories 104 is cyclical. outgoing links are controlled from control memories 108 for establishing calls. The time slots in an outgoing link are selected from frames stored in switch memories 104, which belong to different incoming links.

Figure 2:
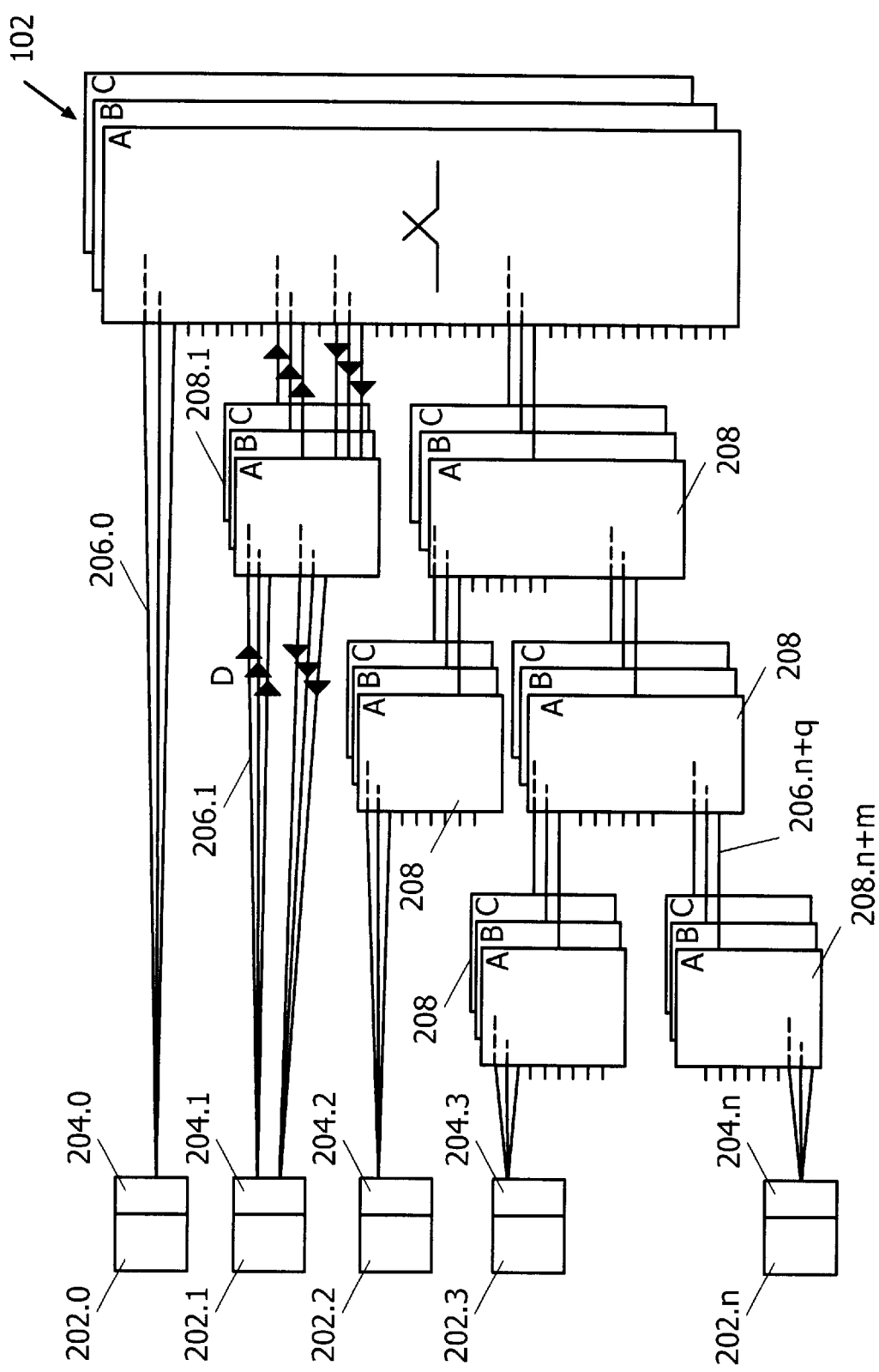
FIG. 2 is a view schematically illustrating the connection of devices via multiplexers in a switch according to FIG. 1, with a three plane redundancy structure, FIG. 3 schematically illustrates a three plane redundancy structure in its entirety for a connection extending over the switch core between an incoming and an outgoing switch port of a switch according to FIGS. 1 and 2, FIG. 4 schematically illustrates a principle for cross connection between the planes for a multiplexer included in FIG. 1.

FIG. 2 is intended to schematically illustrate the device connection and redundancy structure in a switch according to FIG. 1.

Referring to FIG. 2 devices 202.0–202.*n* are connected, independent of type and band requirement, via a respective switch port 204.0–204.*n* to the switch core 102. The connection between each switch port and the switch core is of the two-way type. By devices 202 is here meant all types of subscriber connections, trunk connections and processors etc. For the switch port 204.0 this device connection is shown to extend directly, via a transport link 206.0, whereas for the switch ports 204.1–204.*n* the connection extends over multiplexer/demultiplexer steps, containing one or several multiplexers/demultiplexers 208.1–208.*n+m*, via transport links 206.1–206.*n+q*. For illustrating the two-way connection between the switch ports 204 and the switch core 102, the connection 206.1 via the multiplexer/demultiplexer 208.1 between the switch port 204.1 and the switch core 102 has been marked in FIG. 2 by a double set of lines marked with Du and Di, respectively, for data out from the switch port and for data in to the switch port, respectively.

By means of the multiplexer/demultiplexer steps 208 many devices 202 with varying band width demand can be connected to the switch core 102. More particularly, the multiplexers 208 have the task of performing mapping of data time slots to the links towards the switch core 102, and speed transforming between incoming links 206 with different classes of speed. All data time slots coming from the switch core 102 shall be sent further towards the devices 202 in a certain order. This order can be stated by mapping memories in each demultiplexer, i.e. the demultiplexing can be controllable. Information of how to perform this is loaded in such a case in the mapping memories.

Figure 3:
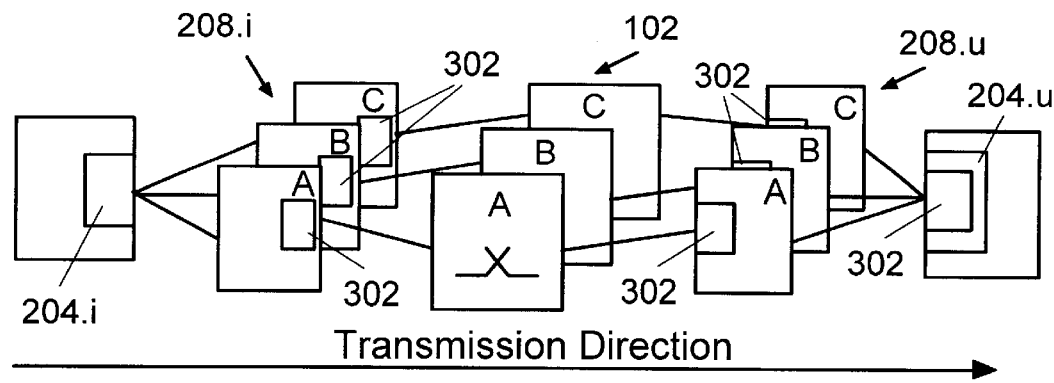

FIG. 2 also indicates a redundancy structure by each multiplexer/demultiplexer 208 and the switch core 102 being shown triplicated. The essential design of this redundancy structure is shown in FIG. 3 for a connection extending over the triplicated switch core 102 between an incoming and an outgoing switch port 204.i and 204.u, respectively. The switch core 102 as well as multiplexers 208.1 and demultiplexers 208.u are each shown as being triplicated in three switch planes A, B, C, which are identical and synchronously operating. In the switch port 204.i spreading is performed to the three switch planes A, B, C and in the switch port 204.u assemblance from the three switch planes is performed.

Incoming and outgoing multiplexer planes 208.i and 208.u, respectively, as well as the outgoing switch port 204.u contain a number of identical maintenance functions generically indicated at 302 in FIG. 3. As will be described more closely below these maintenance functions comprise i.a. the following:

If the three switch planes A, B, C work synchronously, data out to the devices 202 is generated by means of majority vote of the data flows from the three switch planes. The majority vote is performed on a bit level, resulting in transparancy to single faults, and makes that single bit faults in a switch plane will not be observed in a device.

Switch plane comparison based upon the majority vote is used for fault localization.

If one or more switch planes lack meaningful information and synchronism, transition is performed to single plane operation by choosing one switch plane by means of a prioritizing method.

Testing functionality for the above mentioned three functions.

Updating between the switch planes.

The switch planes A, B, C are cross connected for admitting plane comparison and majority vote in all planes. For this purpose there are connections between the planes for spreading, from the multiplexing step 208.i, the switch core 102 and the demultiplexing step 208.u of each switch plane, a respective passing dataflow DATAA, DATAB and DATAC to each multiplexing step 208.i, switch core 102 and demultiplexing step 208.u, respectively, of each switch plane in parallel therewith.

Figure 4:
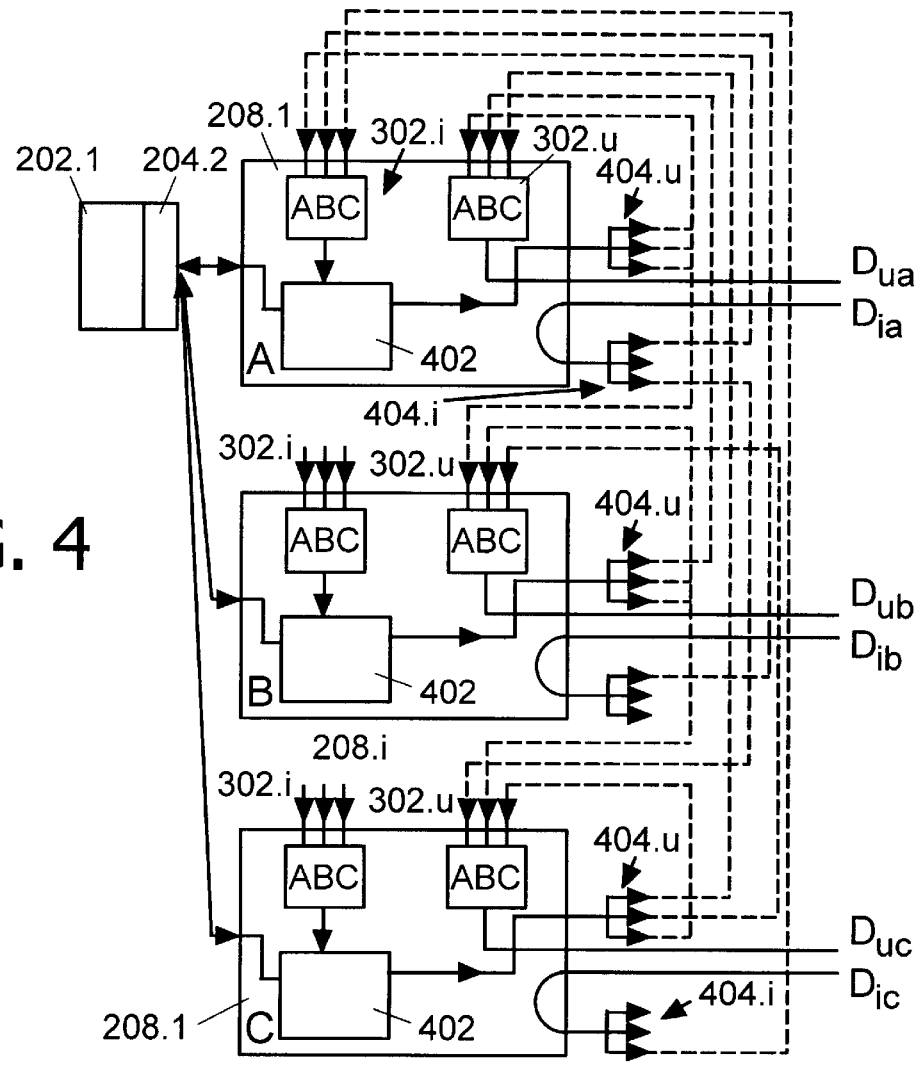

The principle of the cross connection is more closely illustrated in FIG. 4, the triplicated multiplexer/demultiplexer 208.1 between the switch port 204.1 and the switch core 102 in FIG. 2 having been chosen as an example. In FIG. 4 the three planes A, B and C are spread out for elucidating the cross connection principle. Data out from the switch port 204.1 via the planes A, B and C are designated Dua, Dub and Duc, respectively. Data in to the switch port 204.1 via the planes A, B and C is designated Dia, Dib and Dic, respectively. Functionality included in the multiplexer/demultiplexer 208.1 is commonly designated 402 and comprises multiplexing and demultiplexing functionality. In each plane there is included, on the one hand, a spreading function 404u for spreading outgoing data from the multiplexing functionality of the functionality 402 to the other planes, and, on the other hand, a spreading function 404i for spreading incoming data Di to the other planes.

In each plane outgoing data from the spreading function 404u of the three planes A, B and C, respectively is received in a maintenance function 302u for outgoing data, on the output of which majority voted/priority selected outgoing data Dua leaves the multiplexer 208.1. This spreading is completely shown in the Figure by dashed lines with flow arrows.

In each plane incoming data from the respective spreading function 404i of the three planes A, B and C is furthermore received in a maintenance function 302i for incoming data, which can be identically similar to the maintenance function 302u. On the output of the maintenance function 302i majority voted/priority selected data is received that is taken care of by the demultiplexing function of the functionality 402 to be forwarded to devices 202.1 via the switch port 204.1. For the sake of clearness this spreading is shown in the Figure only for data to the maintenance function 302i of the plane A from the respective spreading functions 404i of the planes A, B, C.

In the maintenance functions 302u and 302i, A, B and C designate inputs for data from the planes A, B and C, respectively.

Switch plane comparison performed on a bit level implies 100% fault discovery and furthermore fault localization to a fault affected switch plane. Majority vote performed on a bit level implies possibility of 100% fault isolation. In other words, a fault in a switch plane is isolated by the majority vote and is not passed further. This enables the switch to be transparent to all single faults in the hardware.

For obtaining 100% fault discovery, fault isolation and fault localization to a fault affected switch plane in the switch, there is only needed the switch plane comparison and the majority vote performed in the switch port.

Fault localization only to a fault affected switch plane is, however, not enough. The amount of printed circuit cards that could be suspected for faults has turned out to be unacceptably great. To obtain a refined fault localization and to prevent fault spreading (which makes more difficult fault localization) within the switch planes, a number of switch plane comparisons and majority votes are introduced in the device connection, as well as switch plane comparison in the switch core 102.

In the device connection, i.e. all between the switch core 102 and the switch ports 204, switch plane comparison has thus been introduced in all multiplexers 208. Thereby fault spreading is prevented from device 202 and multiplexer 208 to the switch core 102, and fault affected device cards can be localized as early as possible. To be able to perform majority vote on a bit level, cross connection has been introduced for the links 206. The cross connection between multiplexers 208 in the three switch planes is preferably arranged on the switch core side of the multiplexer step 208, where the number of links 206 to be cross connected is normally considerably less than on the device side.

Figure 5:
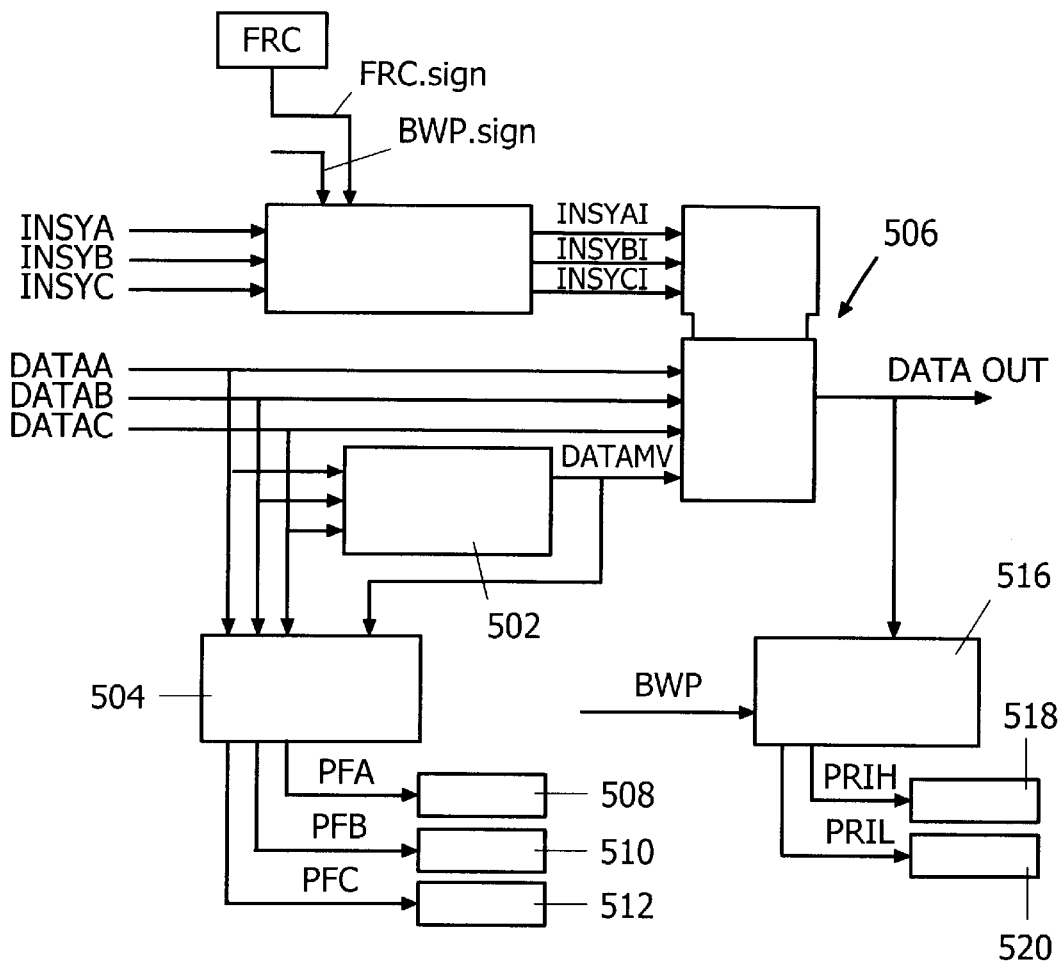
FIG. 5 shows the essential design of a maintenance functionality a number of which being included in the redundancy structure illustrated in FIG. 3.

In FIG. 5 the design of the maintenance function 302 is shown in more detail. As an example, the circuit of FIG. 5 is presumed to be made with 9-bit data buses for a certain type of interface, but can also be used, with small changes, for other types of interfaces. Of the time slots of a frame, nine are reserved for link maintenance, below indicated as maintenance time slots, of which one, below referred to as BWP (Bit Wandering Pattern), includes a test pattern. Furthermore the flow of frames through the switch is presumed to be divided into a number of, e.g., four groups, forming a multiframe. Each frame in the multiframe has a unique code in two of the maintenance time slots, below referred to as FRC1 and FRC2 (FRame Counter). The value of the code is stepped forward with one step within each group but jumps at the transition to the next group. The frames in a multi-frame are identified by a frame counter FRC by means of the code value.

The frame counter FRC is created centrally in the switch. FRC values are majority voted between the planes so as to make them identical. FRC on each other place is principally a copy of the centrally generated FRC.

After clocks included in the switch have started, the multiframe counter FRC shall be synchronized between the planes. FRC is distributed within a plane from a central logic.

The value of the multiframe counter is sent on a maintenance frame, to be described more closely below, to the other planes so that all planes have access to the FRC value of all. The planes then perform majority vote on the FRC information. The result of the Priority vote is used to reload the FRC counter of the own plane. This implies that FRC will be identical between the planes after some frame.

For illustrating that said above, an example of a majority vote of FRC values will be given here. Presume that the decimal FRC values of the planes are: 17, 2559 and 19. Binary, these values correspond to 0000 0001 0001, 1001 1111 1111 and 0000 0001 0011. The value majority voted bit for bit from these values then becomes 0000 0001 0011, this being the same as 19 decimally. This implies that only one simple majority vote needs to be used in order to have the FRC of the planes to run uniformly. The next frame will thus be denominated number 20 in all of the three planes.

In FIG. 5 DATAA, DATAB and DATAC come in from the switch plane A, the switch plane B and the switch plane C, respectively, on each a 9 bit bus. These buses are connected, on the one hand, to a majority vote function 502, on the other hand, to a switch plane comparison function 404 and, on the third hand, to a priority select function 506.

Figure 6:
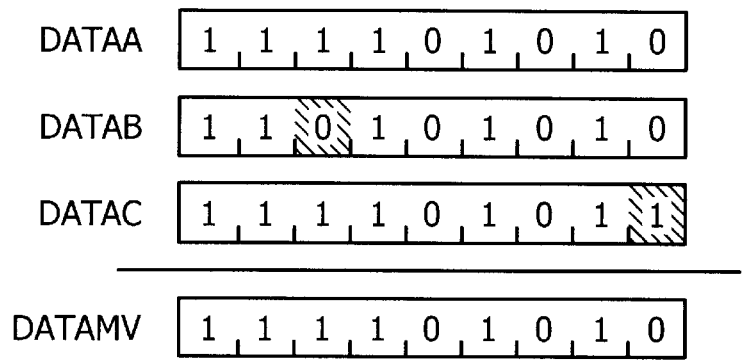
FIG. 6 illustrates the principle for majority vote performed by a majority vote function included in the maintenance functionality according to FIG. 5, FIG. 7 in more detail shows some of the funtions included in the maintenance functionality according to FIG. 5, FIGS. 8*a–c* show tables over test patterns used for routine tests of functions included in the maintenance functionality according to FIG. 5, FIG. 9 schematically illustrates updating of memories between the planes of a three plane redundancy structure according to FIG. 3.

The majority vote function 502 performs majority vote on a bit level and as a result transmits majority voted data DATAMV on a 9 bit bus. To perform the majority vote on bit level has the advantage that it makes the implementation simple but effective when it comes to taking care of single plane faults. In FIG. 6 there is shown for one time slot an example of bit patterns of DATAA, DATAB and DATAC, and the resulting majority voted bit pattern DATAMV. The majority comparison seemingly shows that the third bit is the same for DATAA and DATAC but differs for DATAB, and that the last bit is the same for DATAA and DATAB but not for DATAC. The erroneous bits are shadowed.

The plane comparison function 504 compares each of the signals DATAA, DATAB and DATAC with DATAMV and reports stitch plane faults with signals PFA, PFB and PFC. More particularly, the signals PFA, PFB and PFC appear in the form of a positive pulse when a switch plane fault has been detected in data from the switch plane A, the switch plane B and the switch plane C, respectively, and is sent to each a counter 508, 510 and 512, respectively, for counting the pulses. In the example according to FIG. 6 both PFB and PFC will report switch plane faults for the time slot in question.

When a switch plane is out of sync, the PF signals for the two operating switch planes will still indicate difference, if any, between the switch planes, but it is of course impossible to know which of the two switch planes that is correct. In this case priority selection should be used.

The priority select function 506 is a multiplexer that receives data DATAA, DATAB, DATAC and DATAMV. The multiplexer 506 is controlled by signals INSYAI, INSYBI and INSYCI, to be described more closely below, to generate majority voted or priority selected data DATAOUT, that is emitted on an output in the form of a 9 bit bus. More particularly, the signals INSYAI, INSYBI and INSYCI give an indication of whether the links to switch planes A, B and C have meaningful information and synchronism. If this is true for all three switch planes the multiplexer 506 lets through DATAMV as DATAOUT to the output. If the opposite is true for one or several switch planes, the multiplexer performs selection of a plane based upon an established priority order.

A preferred embodiment of such a priority order is given below:

Plane A lacks sync: Select data from plane B.
Plane B lacks sync: Select data from plane A.
Plane C lacks sync: Select data from plane A.
Planes A and B lack sync: Select data from plane C.
Planes A and C lack sync: Select data from plane B.
Planes B and C lack sync: Select data from plane A.
No plane has sync: Select data from plane A.

A sync deactivating function 514 has three inputs for receiving signals INSYA, INSYB and INSYC, respectively, which by an 1 indicate if the links of the switch planes A, B and C, respectively, have meaningful information and synchronism. In the opposite case they contain a 0. The signals INSYA, INSYB and INSYC are obtained from a link receiver, not described here, that searches a frame sync word and a correct link code. If this is found an 1 will be the result, otherwise a 0. Normally, these signals are let through unchanged by the function 514 as the above mentioned signals INSYAI, INSYBI and INSYCI, respectively.

For the purpose of routine test to bring the signals INSYAI, INSYBI and INSYCI to 0 during certain test time slots the sync deactivating function 514 is, however, controlled by two signals FRC.sign and BWP.sign. More particulary, this is done during certain time slots for each multiframe when the test pattern BWP is generated and FRC.sign indicates particular values. FRC.sign is obtained from the above mentioned counter FRC, which is a 14-bit frame counter. The signal BWP.sign indicates that a current time slot is a BWP time slot.

Figure 7:
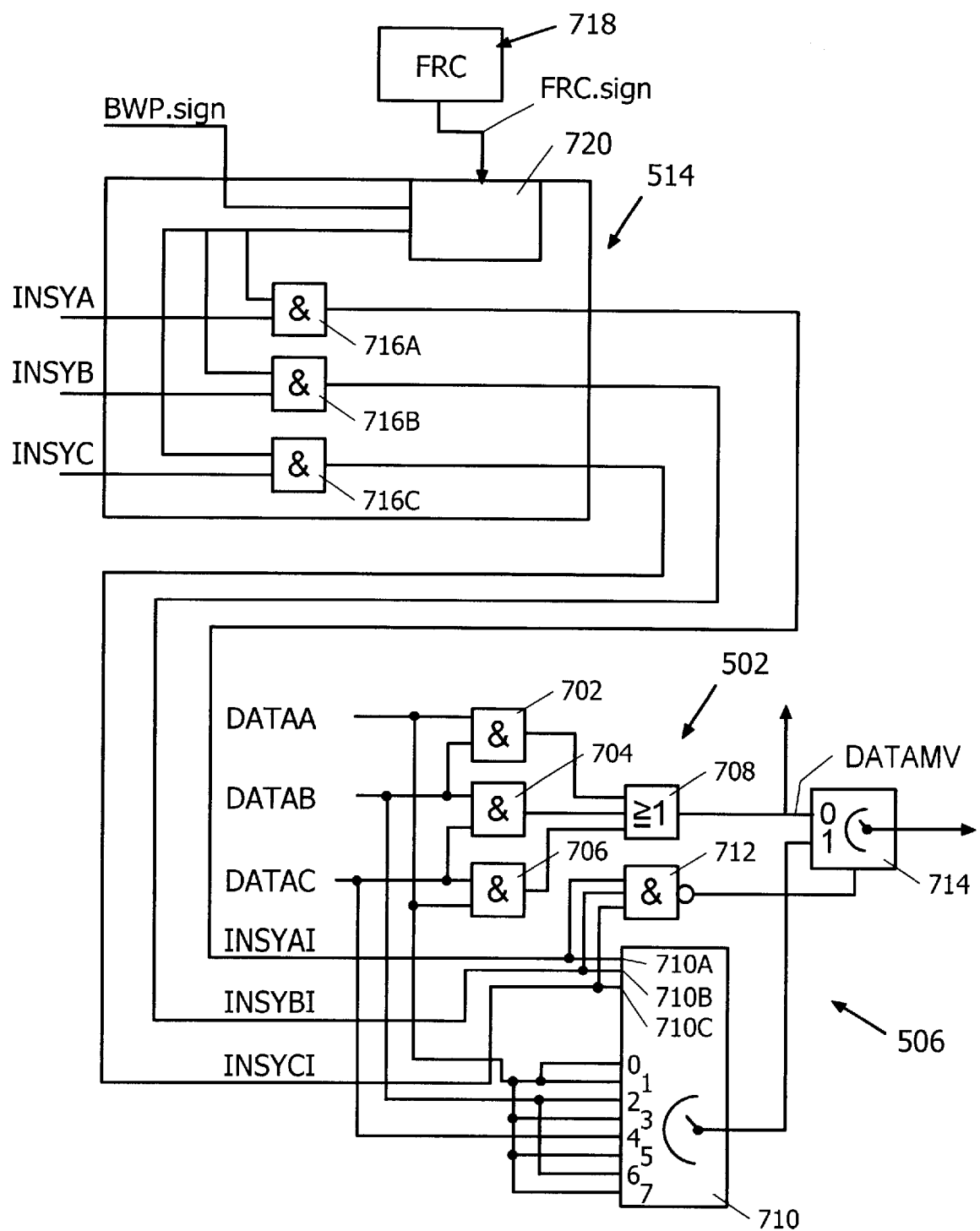

In FIG. 7 the essential design of the majority vote function 502, the priority select function 506 and the sync deactivating function 514 is shown in more detail.

FIG. 7 illustrates the majority voting and priority selecting course on a bit level, i.e. for each bit of the parallel data flows DATAA, DATAB and DATAC, respectively, coming in on a corresponding 9 bit bus. Each bit in the parallel data word, one from each of the planes A, B and C, respectively, is supplied to a set of three AND gates 702, 704 and 706, respectively, followed by an OR gate 708, said elements being included in the majority vote function 502. The three bits are also supplied to a corresponding multiplexer 710 included in the priority select function 506.

More particularly, the three bits are supplied to each a first input of the AND gate 702, 704 and 706, respectively, in the majority vote function 502. On a second input of the AND gates 702, 704 and 706, the bit from the data flow DATAB, DATAC and DATAA, respectively, is supplied. The bits from the outputs of the AND gates 702, 704 and 706 are supplied to each an input of the OR gate 708. If all three data bits appear and are identical, the same bit is obtained for each of the outputs of the AND gates 702, 704 and 706 as well as on the output of the OR gate 708, in accordance with known rules for logical operations. If, to the contrary, there should be difference, a majority voted bit is obtained in the resulting data flow DATAMV.

The priority select function 506 includes, besides nine multiplexers 710, one for each bit, an inverting AND gate 712 and a selector function 714. The three bits from the respective data flow DATAA, DATAB and DATAC are also supplied to eight inputs 0–7 of the multiplexer 710.

More particularly, the bit from the data flow DATAA is supplied to the inputs 0, 1, 3, 5 and 7, the bit from the data flow DATAB is supplied to the inputs 2 and 6, and the bit from the data flow DATAC is supplied to the input 4.

The signals INSYAI, INSYBI and INSYCI from the sync deactivating function 514 are supplied to each an input 710A, 710B and 710C, respectively of the multiplexer 710, as well as to each an input of the inverting AND gate 712.

If any or some of the signals INSYAI, INSYBI or INSYCI would be 0, an 1 appears on the output of the gate 712, otherwise a 0. The outputs of the OR function 708 and the multiplexer 710 are connected to each an input of the selector function 714. The selector function 714 is controlled by the signal appearing on the output of the gate 712 in a way that when this is 1 the output of the multiplexer is selected, otherwise the DATAMV bit from the OR gate 708 is selected.

The function of the multiplexer 708 can be described such that it can be said to be controlled by the binary number that is formed by the inputs 710A, 710B and 710C. If the binary number corresponds to any of the digits 0–7, the multiplexer 708 selects the one of the inputs 0–7, which has a corresponding numbering. The connections for the inputs 0–7 for receiving the data flows DATAA, DATAB and DATAC are then so arranged that in each particular case the output is selected, that suits in the priority order that has been described earlier.

With reference to the sync deactivating function 514 shown more closely in FIG. 7 and a table according to FIGS. 8a–c, routine testing functions included in the redundancy structure will now be described more closely.

In the sync deactivating function 514 the signals INSYA, INSYB and INSYC are supplied from the planes A, B and C, respectively, to a first input of each an AND gate 716A, 716B and 716C, respectively. The signal FRC.sign from the frame counter 718 is supplied to a comparator 720, that has three outputs connected to each a second input of the respective AND gate 716A, 716B and 716C. The comparator 720 compares selected frame code values with FRC.sign. In the table according to FIG. 8a–c these frame code values are indicated in column 2, with the heading FRC [11:0], from line 4, as being the values 0–73. [11:0] indicates that the values are indicated with the bits 11 to 0. As mentioned earlier, the flow of frames through the switch is conceived to be divided into four groups. Column 1 in the table, with the heading FRC [13:12], indicates these groups with the values 0–3 on the four first lines. [13:12] indicates that these values are given with the bits 13 and 12. The routine tests are accordingly performed in group 3.

The comparator 720 also receives the signal BWP.sign as a control signal. When this control signal indicates that the BWP time slot appears in any of the planes A, B, C, at the same time as FRC.sign is equal to one of the selected frame code values, the comparator 720 emits the output signal 0 on the output that is connected to the corresponding AND gate 716A, 716B or 716C. The result will be that the resulting signal INSYAI, INSYBI or INSYCI, respectively, obtains the value 0. In column 6 in the table the one or those of INSYAI, INSYBI and INSYCI is indicated that is forced to take the value 0. If more than one of these signals are set to 0, this is marked by one of the signals being written in its entirety, whereas the following signals are indicated with the two last letters, e.g. INSYAI, BI, CI for the: frames 67 and 68.

Referring to FIG. 5 the output signal DATAOUT is supplied from the priority select function 506 for testing purpose to a pattern detecting function 516 that, controlled by the signal BWP.sign, generates signals PRIH and PRIL, respectively. The signals PRIH and PRIL are both a positive pulse when the binary number 1 1111 1111 and the binary number 0 0000 0000, respectively, is found in DATAOUT during a BWP time slot. The signals PRIH and PRIL are supplied to each a counter 518 and 520, respectively, for counting the pulses. In column 7 in the table the one or those of the functions 504, 502, 506 and 516 being tested are indicated.

For the routine testing functions the logic is autonomously tested by sending a determined test pattern in the BWP time slot: during subgroup 3 in the multiframe. These test patterns are different for all three switch planes and cause a known number of pulses on PFA, PFB, PFC, PRIH and PRIL for each multiframe. In column 8 in the table those of PFA, PFB, PFC, PRIH and PRIL being pulsed are indicated. During the other groups all three switch planes send the binary number 1 1100 0111 in the BWP time slot, as appears from lines 1–3 and the last line in the table.

The test patterns are designed so as to cause, for each multiframe, the following number of pulses in the counters 508, 510, 512, 518, 520 when the logic works correctly:

508: 28 PFA
510: 24 PFB
512: 22 PFC
518: 10 PRIH
520: 10 PRIL

The background to the selected test patterns is as follows:

The majority vote function 502 and the switch plane comparison function 504 are tested by sending a pattern sequence with a wandering 1 and another sequence with a wandering 0 from one switch plane at a time and checks the results of the counting of PFA, PFB and PFC in the counters 508, 510 and 512, respectively, against that expected.

The pattern detecting function 516 is tested by forcing, during the same sequences, one or two of INSYAI, INSYBI, INSYCI to 0 in order to affect DATAOUT and check the result of the counting of PRIH and PRIL in the counters 518 and 520 against that expected.

The priority select function 506 is tested by deactivating, in the sync deactivating function 514, one, two or all three of INSYAI, INSYBI, INSYCI and sehding another pattern from the switch plane expected to be selected than from the other two switch planes. The patterns are binary 1 1111 1111 and 0 0000 0000 and both are sent from the switch plane that is expected to be selected. The whole is done so that all the seven cases of priority selection will be tested.

The sync deactivating function 514 is also tested, since if it forces INSYAI, INSYBI, INSYCI to 0 during the wrong BWP time slots, the number of PRIH and PRIL will be erroneous.

While referring to the table shown in FIG. 8a–c a closer description will now be made of the test course discussed above in short.

As an introduction a summary of the tasks of the BWP time slot will first be given here.

The BWP time slot is used for automatic routine tests of circuits for switch plane comparison, majority vote and priority selection. Differences between switch planes are deliberately introduced in this time slot. An obtained fault indication is interpreted as a confirmation that the fault detecting circuits work correctly.

The BWP time slot is correlated to the frame counting. The tests are performed during one of the frame groups, viz.

frame group 3. In all other frames BWP has the constant value of 1 1100 0111 on all switch planes.

The test courses proceed according to the following while, for the below mentioned frames, the columns 6, 7 and 8 as mentioned above indicate which of INSYAI, INSYBI and INSYCI that is forced to 0, which of PC, MV, PRI and 516 that is tested, respectively which of the signals PFA, PFB, PFC, PRIH and PRIL that is pulsed.

The BWP time slot is first set to 1 1111 1111. In the switch plane A the nine bits are set one by one to 0. This is done in the frames 0–8 in the frame group 3.

Thereupon the procedure is repeated but with the values reversed. The value is set to 0 0000 0000 and in the switch plane A the nine bits are set one by one to 1. This is done in the frames 9–17 i the frame group 3.

However, there are two exceptions: in frame 0 bit 7 is changed from 1 to 0 in all the three switch planes. In frame 10 bit 8 is changed from 0 to 1 in all the three switch planes. The reason for these exceptions is that the link code cannot transfer wall possible combinations of nine bits in a time slot.

In the frames 18–21 of the subgroup 3 the BWP time slot is used to test the priority selection.

Thereupon follow frames 20–40 with wandering zeros and ones in the switch plane B followed by two frames 41, 42 with test of the priority selection.

Thereupon follow frames 43–59 with wandering zeros and ones in the switch plane C followed by 14 frames 60–73 with test of the priority selection.

The remaining BWP time slots in the multiframe are not used for testing. They are set to 1 1100 0111.

Figure 9:
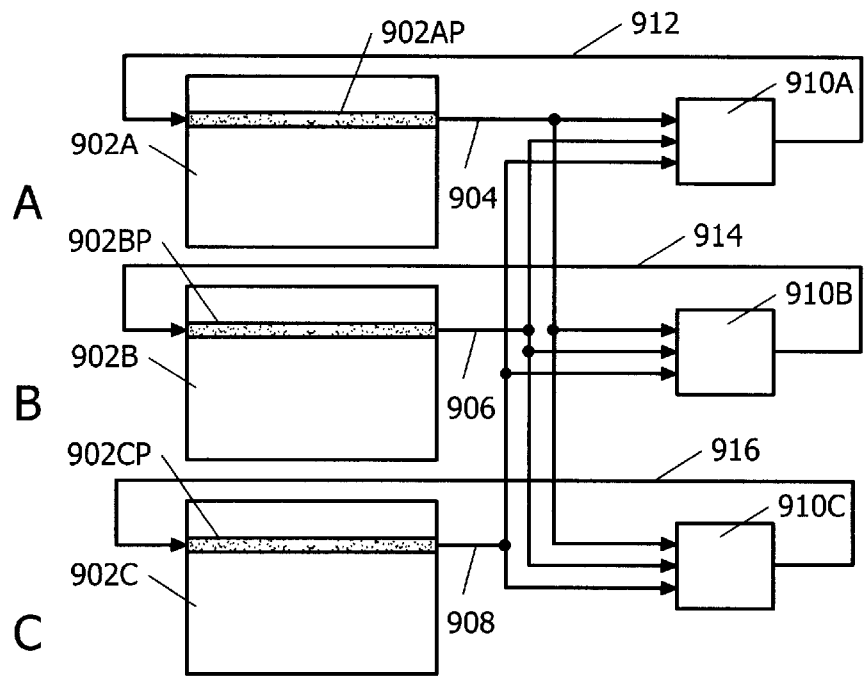

FIG. 9 schematically illustrates rewriting/updating between the switch planes A, B and C of memory positions in a three plane redundancy structure of the kind described above. The updating is performed continuously by reading out in each plane a position 902AP, 902BP and 902CP from a memory 902A, 902B and 902C, respectively, in each of the planes according to arrows 904, 906 and 908 to a majority vote/priority select function 910A, 910B and 910C, respectively in the own plane. The majority voted/priority selected information is sent back according to arrows 912, 914 and 916, respectively, to the memory 902A, 902B and 902C, respectively, from which the reading was done and is rewritten in the same position 902AP, 902BP and 902CP, respectively. The majority vote/priority select functions 910 can be of essentially the same kind as has been described earlier for handling the data flows on a bit level between switch core and switch ports.

Rewriting/updating is used, on the one hand, for removing the effect of so-called soft errors in memory circuits and, on the other hand, for obtaining an automatic updating in case of change of card. At rewriting/updating of information in various memories also plane comparison is performed besides majority vote/priority selection.

The switch core 102 can contain many printed circuit cards, as opposed to the multiplexers 208 and the switch ports 204. For fault localization within e.g. the switch core 102 a plane comparison is done between the three planes A, B and C of a counted check sum according to the principle Cyclic Redundancy Check (CRC). A check sum is counted for each printed circuit card interface synchronously in the three planes A, B and C. Although the switch core has here been mentioned as an example, such a fault localization can be generally done between all printed circuit cards where majority vote is not used for some reason.

Figure 10:
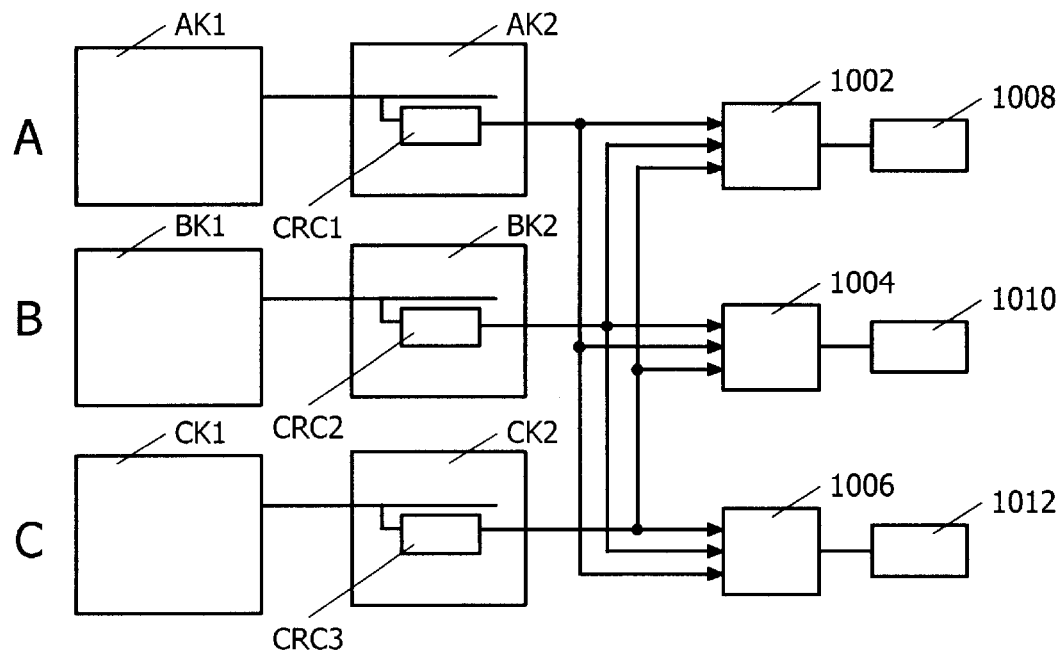
FIG. 10 illustrates how to base fault localization within the switch core of a switch according to FIGS. 1–3 on a plane comparison between the three planes A, B and C of a worked out check sum.

FIG. 10 for each plane A, B and C shows two interconnected printed circuit cards AK1 and AK2, BK1 and BK2 and CK1 and CK2, respectively. At CRC1, CRC2 and CRC3, respectively a function is indicated in the respective plane for counting a check sum for the interfaces between the respective shown cards.

The check sums for all printed circuit interfaces, in the present example the three card interfaces in FIG. 10, are plane compared on a bit level in turn in the respective planes. Functions for plane comparison are shown in FIG. 10 at 1002, 1004 and 1006, respectively, which are connected to the functions CRC1, CRC2 and CRC3 for receiving the check sums from all the three planes.

Devices 1008, 1010 and 1012 are used to investigate if some checksum, from any plane, differs from an expected value and, if this is the case, point to the check sum that is wrong. The majority voted check sums can e.g. be transferred in a maintenance frame, the pointing out being performed by searching the position of the erroneous check sum in the maintenance frame. From this position the card interface affected by a fault appears directly. In this way fault localization in the switch core can always limit the number of fault suspected printed circuit cards to just two.

That described above is a type of CRC generation, below denominated CRCMV (CRC Majority Vote), that is generated for each incoming data link to a printed circuit card. This CRC is assembled centrally together with the CRC of all other links to a maintenance loop that is majority voted. Arisen bit faults result in fault flags used for fault identification.

Another type of CRC generation is used only for checking if the maintenance link is fault free. It would be meaningless to send a lot of CRCMV check sums to the majority vote logic if the maintenance link itself, carrying this information, is erroneous. CRC is generated framewise on data transferred on the maintenance link. This CRC is put into a certain time slot in the frame. At the receiver end CRC is generated in the same way and is compared to the transmitted CRC from the sender side. These CRC check sums are below denominated CRCLG and CRCLC, respectively, where LG stands for Link Generate and LC stands for Link Check. If CRCLG does not agree with CRCLC this will of course affect the judgement of transmitted fault flags on the maintenance link. Only maintenance links are provided with CRCLG/LC. Most of the other links are provided with CRCMV.

The same transport paths are used for transferring check sums as for performing updating of information according to that described above with reference to FIG. 9.

What is claimed is:

1. A redundancy system for a functional entity in a digital switch, wherein the functional entity is at least triplicated in planes working in parallel, the redundancy system comprising:

means for spreading from each plane a respective passing-by data flow to each plane in parallel therewith, and a unit for each plane for maintenance functions including a majority vote function that receives the data flows of a plane and the planes in parallel therewith and compares these on a bit level for creating a majority voted data flow, a plane condition sensing function, that indicates if links of the planes have meaningful information and synchronism and as a result emits a link condition indicating signal for each plane, that forms an indication thereof, and a priority select function, that is connected to receive the majority voted data flow and the link condition indicating signals and if the latter do not indicate a fault condition, lets the majority voted data flow through as an outgoing data flow from the functional unit, but in case of indication of a fault condition in one or more of the link condition indicating signals selects the data flow from one of the planes as an outgoing data flow on the basis of a determined priority order.

2. A redundancy system for a digital switch with switch inputs and switch outputs and switch equipment therebeteween, that comprises a switch core and functional entities, a connection path for data flow between a switch input and a switch output being able to include a number of such functional entities on both sides of the core, said redundancy system including switch planes working in parallel and having mutually substantially identical switch equipment and majority vote functions, spreading means for spreading a data flow coming in from the outside to the equipment of the switch planes, and assembling means for assembling the data flows coming from the switch planes, wherein the redundancy system is distributed to at least a plurality of the functional entities on each of said connection paths, in a way that each such functional entity has its own redundancy subsystem with planes working in parallel and comprising means for spreading from the equipment of each plane a respective passing-by data flow to the equipment in parallel therewith, and wherein each plane and each switch output has a unit for maintenance functions including a majority vote function that receives the data flows of a plane and the planes in parallel therewith and compares these on a bit level for creating a majority voted data flow, a plane condition sensing function, that indicates if links of the planes have meaningfull information and synchronism and as a result emits a link condition indicating signal for each plane, that forms an indication thereof, and a priority select function, that is connected to receive the majority voted data flow and the link condition indicating signals and if the latter do not indicate a fault condition, lets through the majority voted data flow as an outgoing data flow from the functional unit, but in case of indication of a fault condition in one or more of the link condition indicating signals selects the data flow from one of the planes as an outgoing data flow on the basis of a determined priority order.

3. A redundancy system according to claim 1, wherein the unit for maintenance functions also includes a plane comparison function that compares the parallel data flows with the majority voted data flow and in case of deviation from this emits a fault indicating signal for the deviating data flows.

4. A redundancy system according to claim 1, wherein the majority vote function is tested by successively temporarily changing the look of the data flows from the planes in a way that in the data flow from one plane at a time there is introduced a sequence of known test bit patterns.

5. A redundancy system according to claim 4, wherein a pattern detecting function is connected to the output of the priority select function for sensing in the outgoing data flow said test bit pattern during determined sections (BWP) of the data flow.

6. A redundancy system according to claim 5, wherein the plane condition sensing function receives a link condition indicating input signal for each plane and forwards these as link state indicating output signals to the priority select function, and includes means to impart to one or more of the link condition indicating output signals link fault indicating values during said determined section of the data flow.

7. A redundancy system according to claim 6, wherein the priority select function is tested by deactivating one or more of the link condition indicating signals and sending other signal patterns from the plane expected to be selected than from the other two planes in such a way that all cases are simulated that can appear according to the determined priority order.

8. A redundancy system according to claim 1, further comprising:

means in each plane for continuously rewriting/updating memory positions between the planes, means for reading out one position from a memory, in each plane to a majority vote/priority select function in the respective plane, and means for returning the result from the majority vote/priority selection to the memory of a plane and writing it on the same position.

9. A redundancy system according to claim 1, wherein for fault localization of circuit cards there are means for producing a count of a checksum for each circuit card interface in all of the planes, and means for plane comparison of check sums on a bit level in turn in the respective planes, means for indicating, in case of deviation in some checksum, from any plane, this deviation and pointing out the check sum that is wrong.

10. A method for providing a redundancy structure for a functional entity in a digital switch, comprising the step of at least triplicating the functional entity in planes working in parallel, spreading from each plane a respective passing-by data flow to each plane in parallel therewith, and performing in each plane the following steps:

the data flows of a plane and the planes in parallel therewith are compared on a bit level for creating a majority voted data flow, indication is performed of whether the links of the planes have meaningful information and synchronism and as a result a link condition indicating signal is emitted, and the link condition indicating signals do not indicate a fault condition, the majority voted data flow is emitted as an outgoing data flow, but in case of indication of a fault condition in one or more of the link condition indicating signals, the data flow from one of the planes is selected as an outgoing data flow on the basis of a determined priority order.

11. A method for providing a redundancy structure for a digital switch with switch inputs and switch outputs and switch equipment therebetween, that comprises a switch core and functional entities, a connection path for data flows between a switch input and a switch output being able to comprise a number of such functional entities on both sides of the core comprising the step of distributing the redundancy system to at least a plurality of the functional entities on each of said connection paths, in a way that each such functional entity obtains its own redundancy subsystem with planes working in parallel, and spreading from the equipment of each plane a respective passing-by data flow to each equipment in parallel therewith, and performing in each plane and each switch output the following further steps of comparing data flows of a plane and the planes in parallel therewith on a bit level for creating a majority voted data flow, indicating whether links of the planes have meaningful information and synchronism and as a result emitting a link condition indicating signal for each plane, that forms an indication thereof, and letting through, if the link condition indicating signals do not indicate a fault condition, the majority voted data flow as an outgoing data flow, but selecting, in case of indication of a fault condition in one or more of the link condition indicating signals, the data flow from one of the planes as an outgoing data flow on the basis of a determined priority order.

12. A method according to claim 10 further comprising comparing parallel data flows with the majority voted data flow and emitting, in case of deviation from this, a fault indicating signal for the deviating data flow or flows.

13. A method according to claim 12, further comprising testing the majority vote and the plane comparison by successively temporarily changing the look of the data flows from the planes by introducing in the data flow from one plane at a time a sequence of known test bit patterns.

14. A method according to claim 13, further comprising sensing, in the outgoing data flow, the test bit pattern during determined sections of the data flow.

15. A method according to claim 14, further comprising receiving a link condition indicating input signal for each plane and forwarding these signals as link state indicating ouput signals to the priority selection, and, for testing the pattern detecting function, imparting link fault indicating values during determined sections of the data flow to one or more of the link condition indicating output signals.

16. A method according to claim 15, further comprising testing the priority selection by deactivating one or more of the link condition indicating signals, and sending other signal patterns from the plane expected to be selected than from the other two planes so as to simulate all cases that can appear according to the determined priority order.

17. A method according to claim 10, further comprising continuously performing, between the planes, rewriting/ updating of memory positions by the steps of reading out one position from a memory in each of the planes and exposing the position to a majority vote/ priority selection in the respective plane, and passing the result from the majority vote/priority selection back to the memory of a plane and writing it into the same position.

18. A method according to any of claim 10, further comprising performing, for fault localization of circuit cards, the steps of counting a checksum for each circuit card interface in all of the planes, performing plane comparison of check sums on a bit level in turn in the respective planes, and.

in case of deviation in some checksum, from any plane, indicating this deviation and pointing out the erroneous check sum.

* * * * *

UNITED STATES PATENT AND TRADEMARK OFFICE
CERTIFICATE OF CORRECTION

PATENT NO.      : 6,295,274 B1
DATED           : September 25, 2001
INVENTOR(S)     : Peter Lundh and Anders Bjenne It is certified that error appears in the above-identified patent and that said Letters Patent is hereby corrected as shown below:

<u>Title page,</u>
Item [63], the Related Application information should read:

-- Item [63], Related U.S. Application Data, This application is a continuation of an International Application filed on October 2, 1996.--

Signed and Sealed this

Sixth Day of August, 2002

Attest:

Attesting Officer

JAMES E. ROGAN
*Director of the United States Patent and Trademark Office*